Oct. 26, 1926.
E. T. PETERSON
1,604,755
PLANING AND UPSETTING MACHINE
Filed May 12, 1925    9 Sheets-Sheet 1
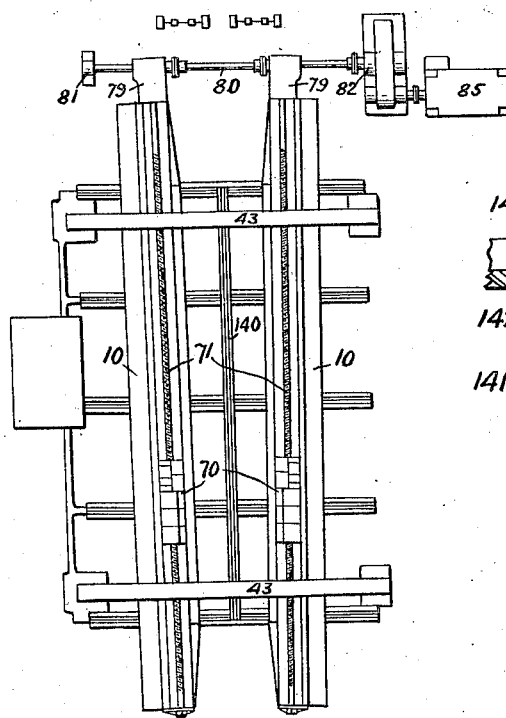
FIG. 1.
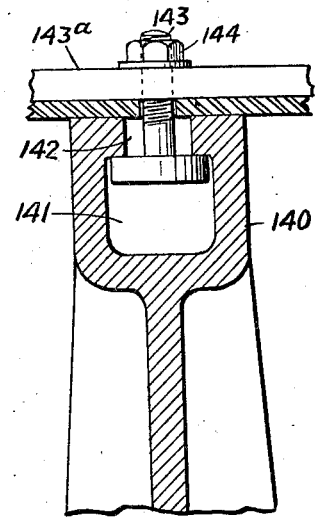
FIG. II.
WITNESS:
Robt R Kitchel
INVENTOR
Edward T. Peterson
BY
Cyrus N. Anderson
ATTORNEY.

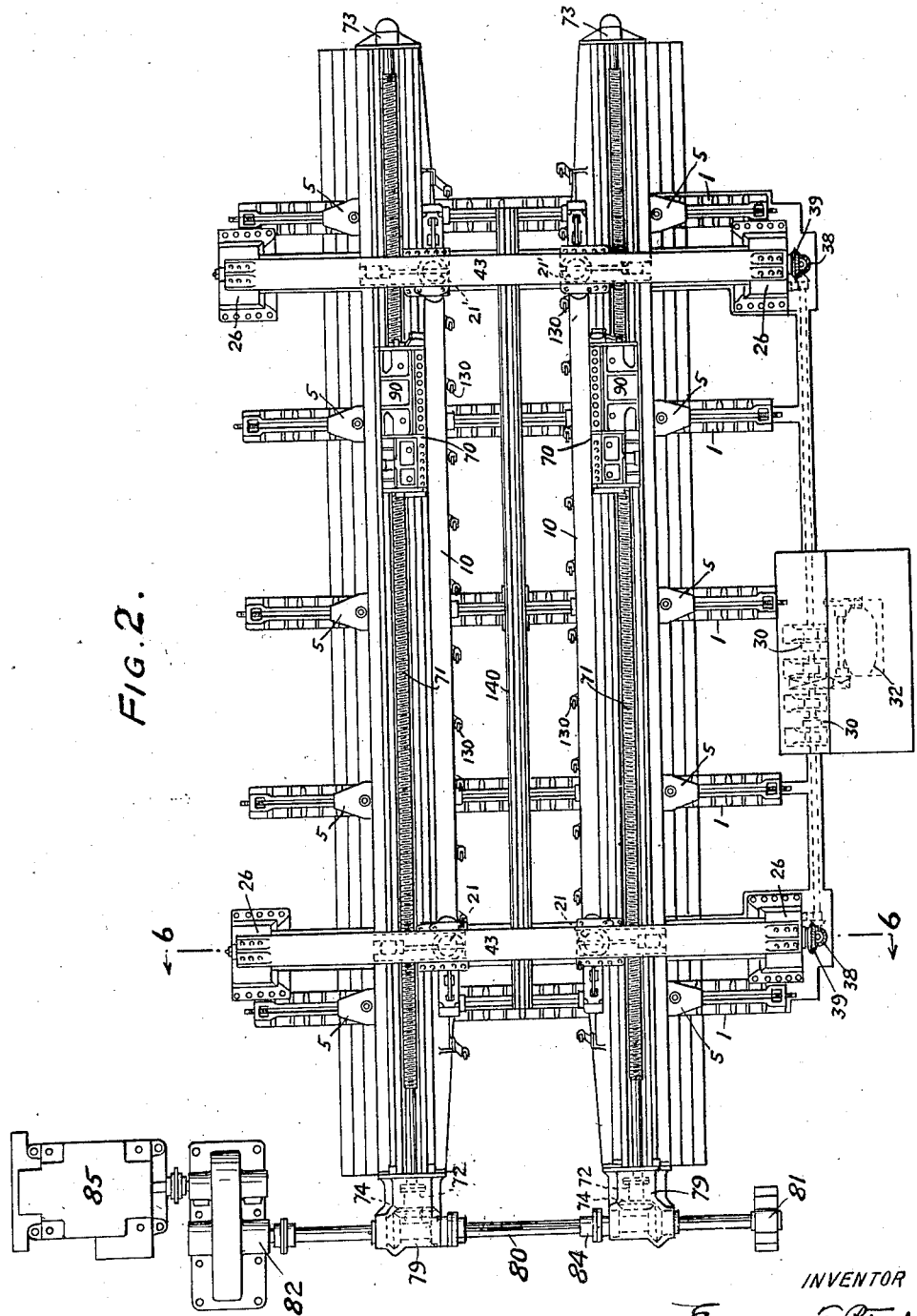

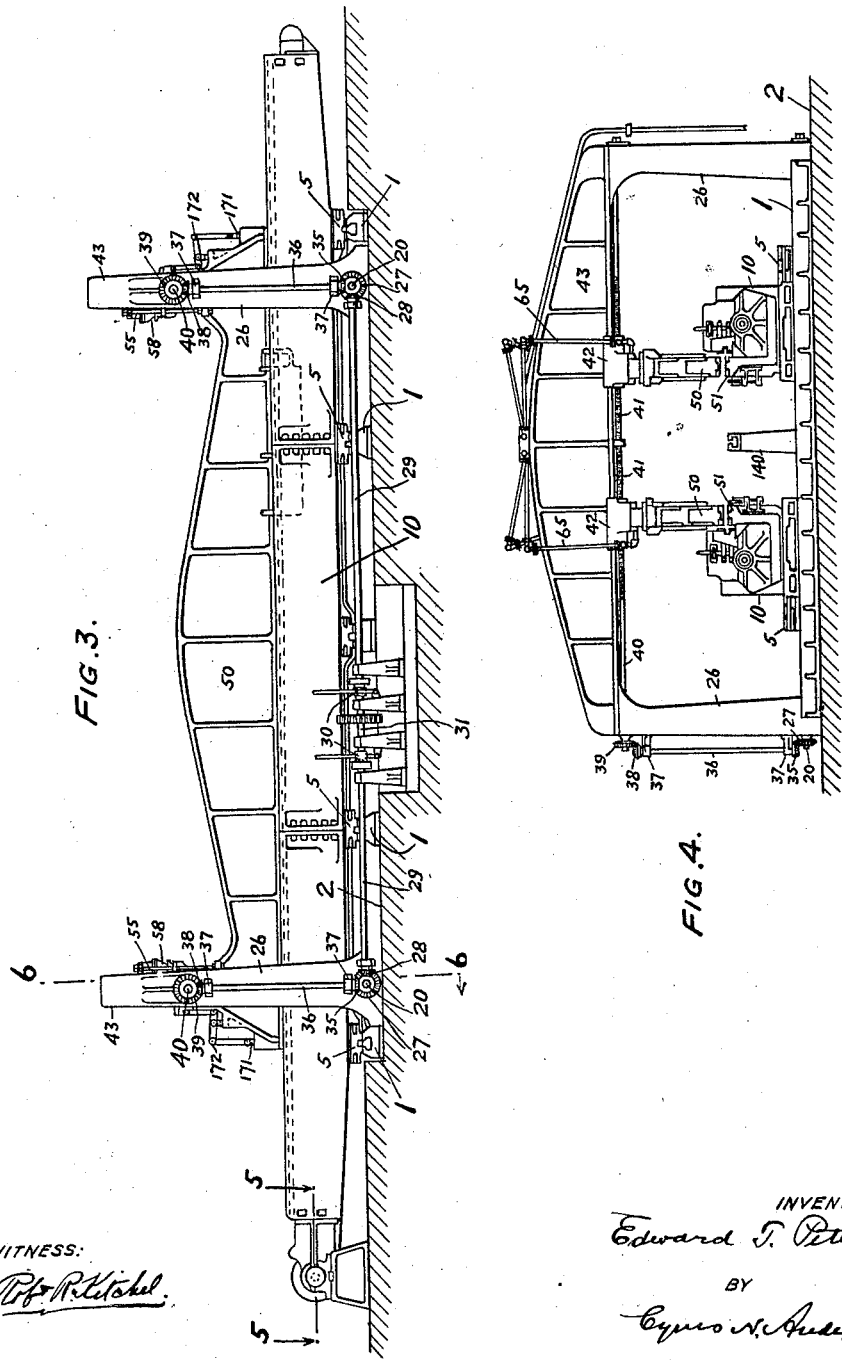

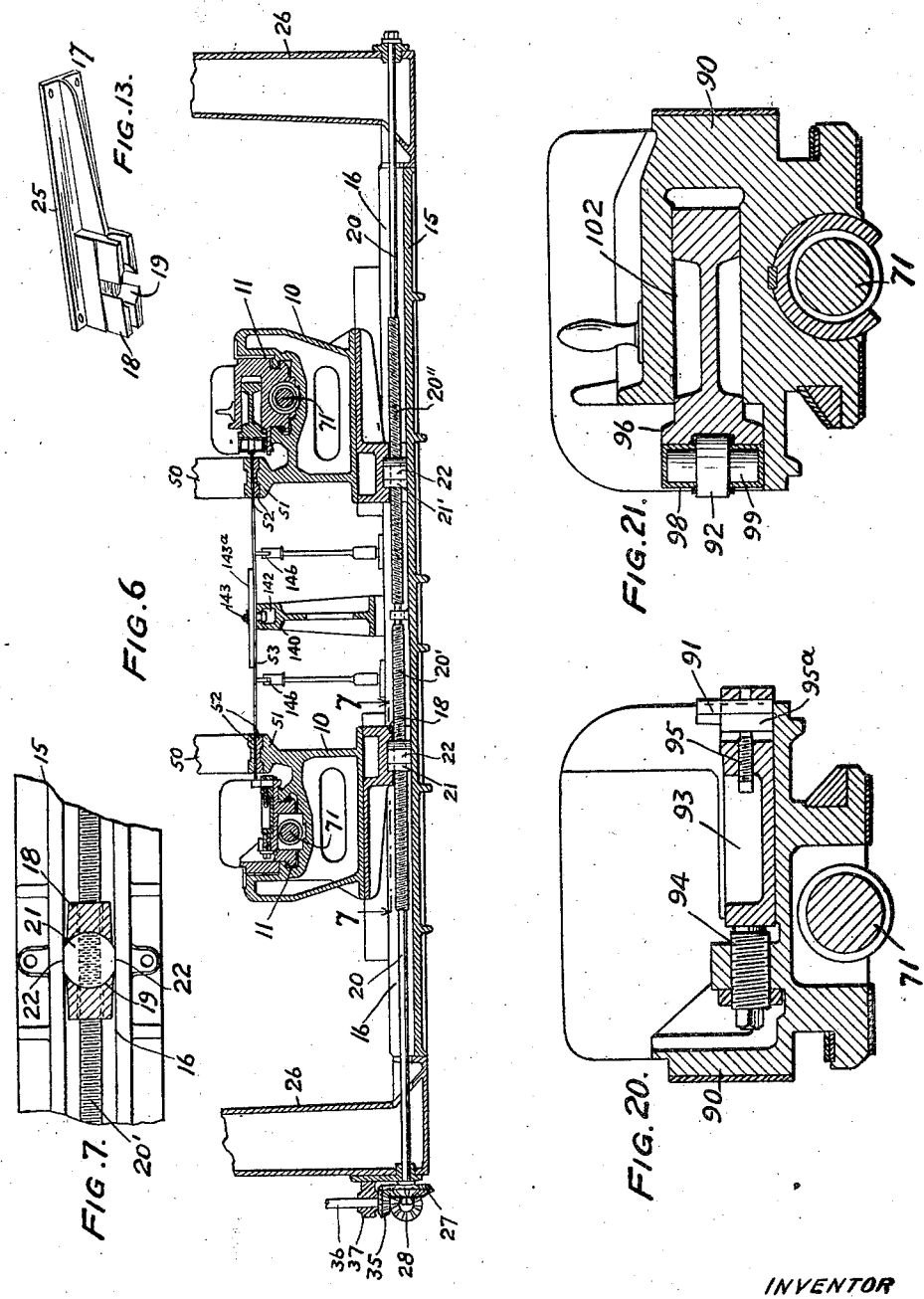

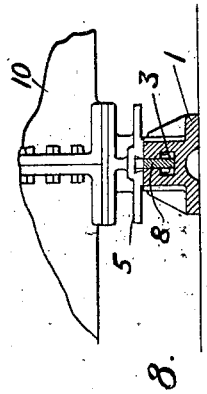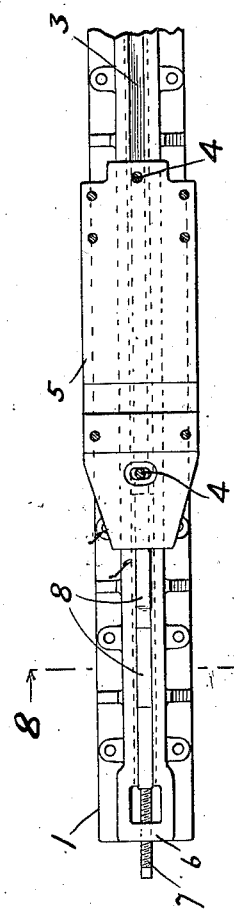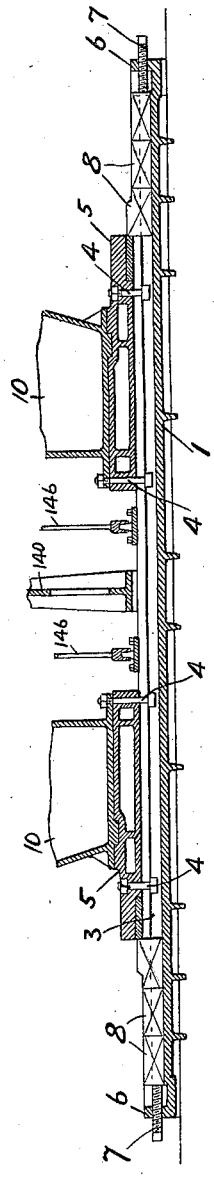

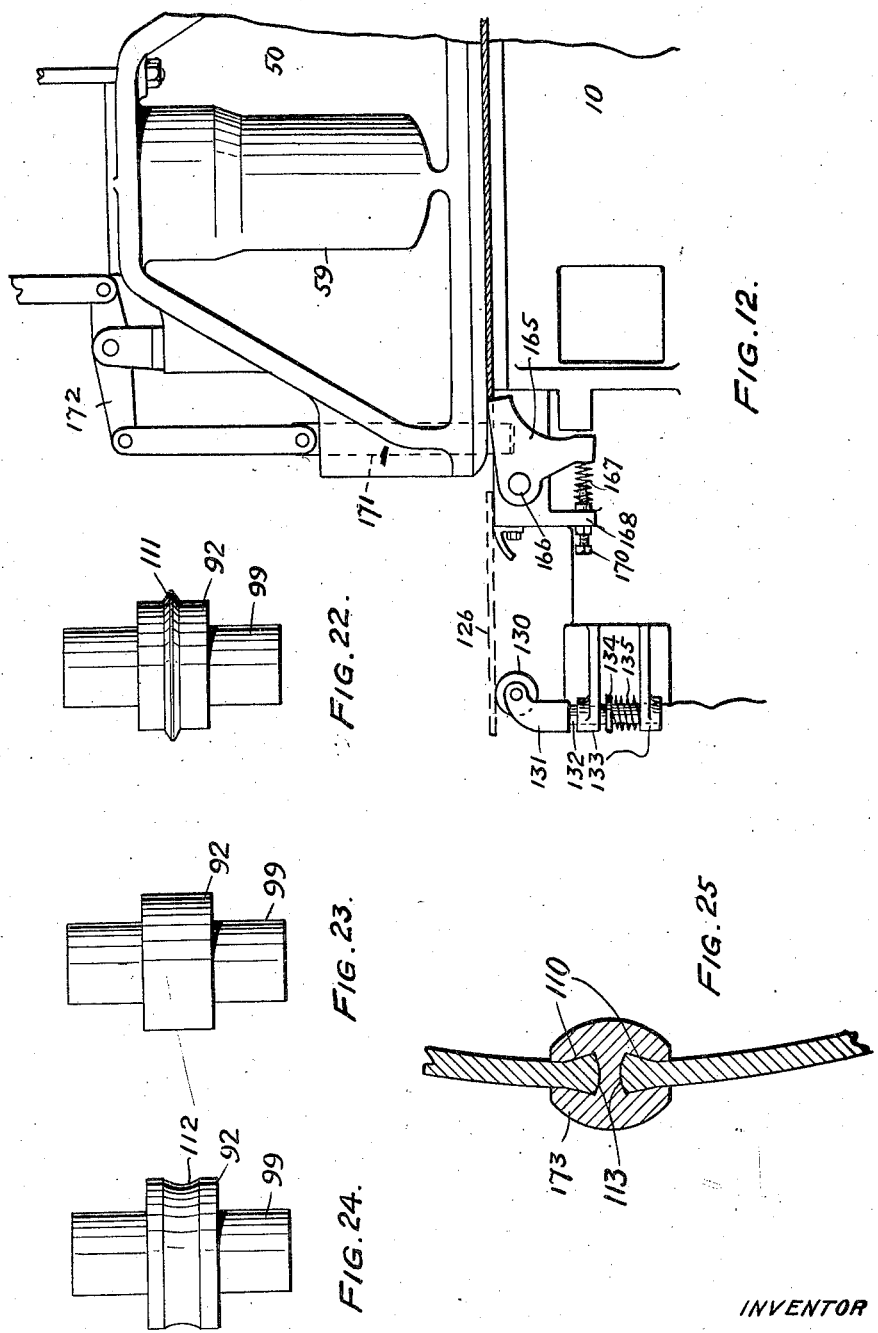

Oct. 26, 1926.
E. T. PETERSON
1,604,755
PLANING AND UPSETTING MACHINE
Filed May 12, 1925    9 Sheets-Sheet 8
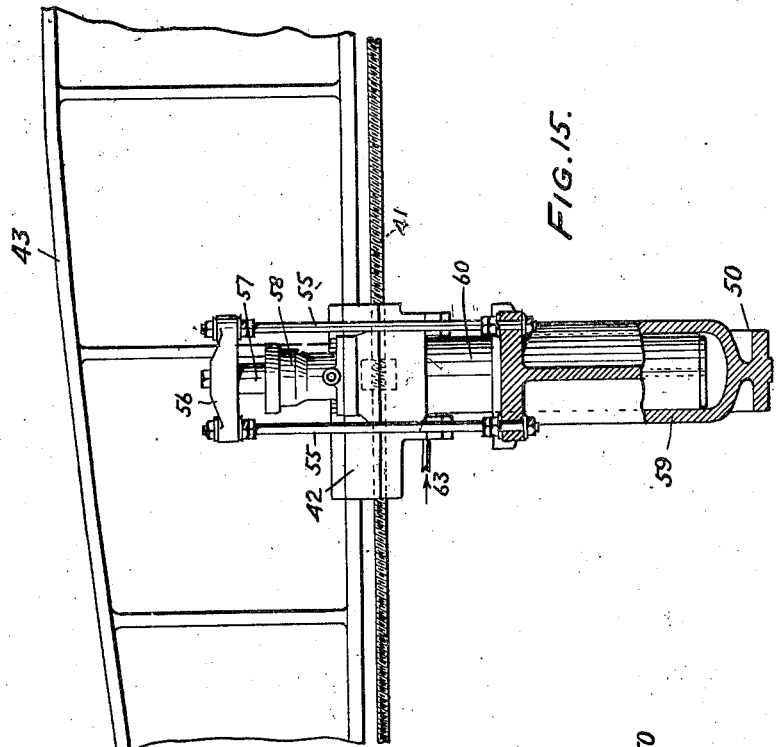
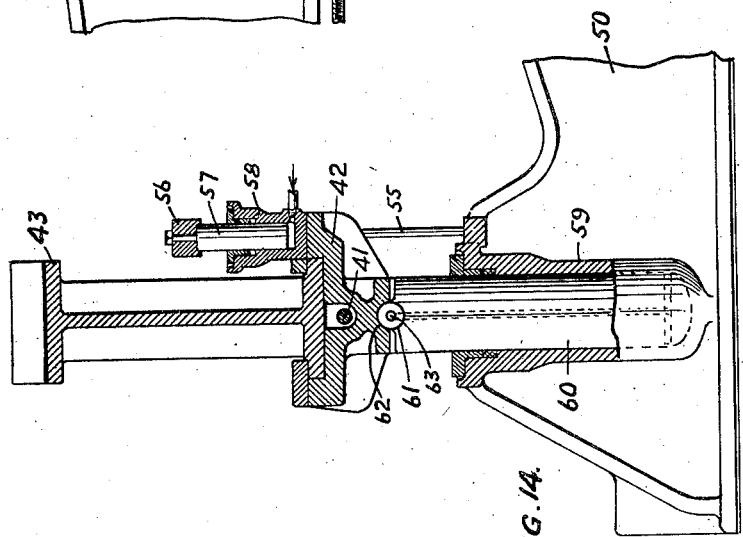
WITNESS:
INVENTOR
Edward T. Peterson
BY
Cyrus N. Anderson
ATTORNEY.

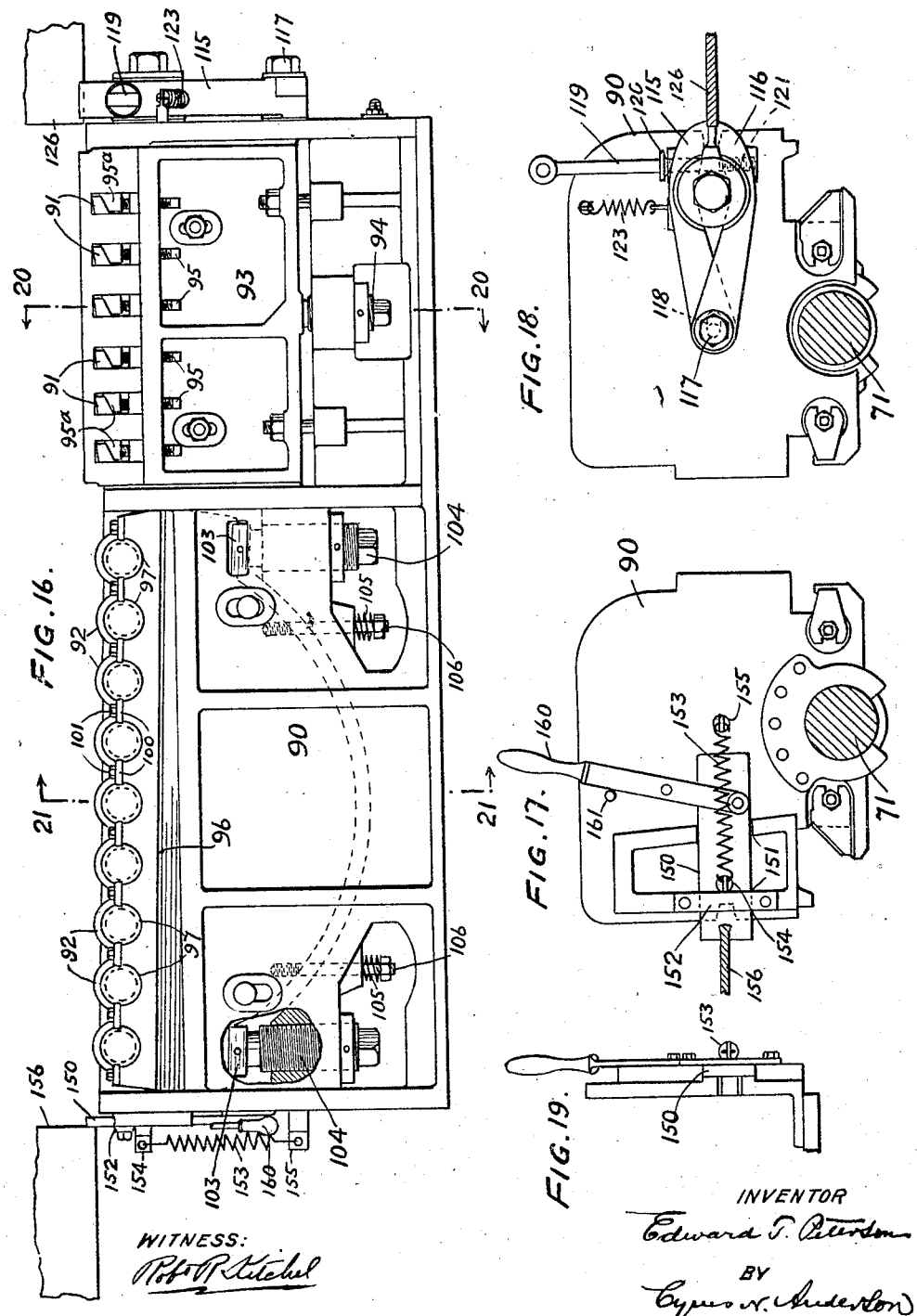

Patented Oct. 26, 1926.

1,604,755

UNITED STATES PATENT OFFICE.

EDWARD T. PETERSON, OF READING, PENNSYLVANIA, ASSIGNOR TO BIRDSBORO STEEL FOUNDRY AND MACHINE COMPANY, OF BIRDSBORO, PENNSYLVANIA, A CORPORATION OF PENNSYLVANIA.

PLANING AND UPSETTING MACHINE.

Application filed May 12, 1925. Serial No. 29,695.

My invention relates to machines or mechanism for planing the opposite edges of metal plates and for upsetting the said edges after they have been planed. Plates as thus produced having their opposite edges upset are well known articles of manufacture and commerce and are employed in the manufacture of pipe, boiler casings, tanks, stand pipes, etc. Pipes manufactured of such plates are in common use for the construction of water supply systems, sewage disposal systems and other systems of hydraulic engineering. When employed in the manufacture of pipes which in turn are to be embodied in a water system, a sewage system, or the like, the said plates with upset edges should be tapered in order that the pipes constructed therefrom shall be tapered so that the small end of one pipe may enter the large end of an adjoining pipe. The taper should be such that the inserted end shall fit closely the interior end portion of the pipe into which it is inserted. The overlapped end portions of the pipes may be connected together by riveting or in any other suitable manner. The plate sections to be employed for the construction of pipes are usually supplied in tapered form but it is not necessary that they shall be, because the taper may be produced by the machine employed for planing and upsetting the edges thereof. The tapers of the plates may vary. For instance, plates to be employed in the manufacture of long sections of pipe have less taper per unit of linear length than those which are to be employed in the manufacture of short lengths of pipes such as those which may be employed in the formation of the lateral bends of conduits or in the making of branch connections, etc. In other cases, as in the manufacture of boiler casings, tanks, etc., the plates should not be tapered because the final structure desired is of cylindrical shape and of equal diameter throughout its length.

From the foregoing it follows that it is necessary in a machine of the character under consideration that it have a capacity of planing and upsetting the edges of plates in which the said edges may be either parallel to the medial lines of the plates, or in which such edges may extend at angles to such medial lines.

Machines have been constructed heretofore and employed having such capacity but it has been possible to operate only upon one edge of a plate or sheet at a time and after finishing one edge it has been necessary to remove the said plate or sheet and place the opposite edge thereof in position to be operated upon.

The general object of the present invention is to provide a machine having novel means whereby both edges of a plate may be planed simultaneously and upset simultaneously, the upsetting being effected or accomplished immediately following the planing of the edges in the same operation.

It is also an object of the invention to provide novel means whereby the planing and upsetting means may be adjusted toward and from each other so as to place or adjust the same in position to operate upon plates of different widths.

Another object of the invention is to provide means of novel construction whereby the means for supporting and along which the planing and upsetting mechanisms travel may be adjusted either into positions which are in parallel or angular relation with respect to each other in order that the planing and upsetting mechanisms may operate upon the edges of a plate which are parallel to the medial line thereof or which may be angularly related to the said medial line.

A further object of the invention is to provide means upon the planing and cutting mechanisms of the structure by which, upon the back and forth movements of such planing and cutting mechanisms in the machine, a new plate to be operated upon may be conveyed into the machine and a finished plate removed therefrom.

A still further object of the invention is to provide means whereby the supporting carriers along which the planing and upsetting mechanisms are caused to travel are adapted and permitted to assume different angular positions with respect to the means for driving the same for effecting traveling movement of the planing and upsetting mechanisms thereon.

A further object of the invention is to provide means whereby the lateral bowing movement of the plates, due to the very great pressures to which the opposite edges thereof are subjected in the planing and upsetting operation, is limited to a minimum. The importance of the provision of some such means will be apparent when it is understood that in some cases the width of the plates operated upon is as much as twelve feet and perhaps even greater. It will of course be understood that the plates operated upon may be much narrower than the maximum above indicated.

No attempt or endeavor will be made at the present time to point out the many further objects and advantages incident to the invention but such additional or other objects will be referred to in the specification which follows or will be or become apparent therefrom.

In order that the invention and its principle of operation may be readily understood and its practical and commercial advantages fully appreciated, reference may be had to the accompanying drawings in which is shown one convenient form of mechanical embodiment of the same. However, it will be understood that the invention is susceptible of embodiment in other mechanism or means than that shown and that changes in the details of construction may be made within the scope of the claims without departing from the said invention.

In the drawings:

Fig. 1 is a top plan view showing more or less generally and schematically a machine embodying my invention;

Fig. 2 is a top plan view showing in greater or less detail the mechanism of the machine, the work feeding in and out tables or supports being omitted;

Fig. 3 is a view in side elevation of the structure shown in Fig. 2;

Fig. 4 is a view in rear elevation of the structure shown in Figs. 2 and 3;

Fig. 6 is a transverse sectional view taken on the line 6—6 of Figs. 2 and 3;

Fig. 7 is a top plan view taken in the plane 7—7 of Fig. 6;

Fig. 8 is a transverse sectional view of a shoe plate taken on the line 8—8 of Fig. 9;

Fig. 9 is a top plan view of a portion of a shoe plate and of a shoe mounted thereon;

Fig. 10 is a central vertical longitudinal sectional view of a shoe plate, the shoes mounted thereon and portions of other mechanism embodied in the construction;

Fig. 11 is a transverse sectional view of the upper portion of a central stationary work support and holding member;

Fig. 12 is a vertical longitudinal sectional view of the front end portion of the machine, portions of the structure being shown in elevation;

Fig. 13 is a perspective view of one of the pivoting devices shown in Fig. 6 one of which is shown in section in Fig. 7;

Fig. 14 is a sectional view showing in detail a portion of the means by which the vertically movable gripping beams at the opposite sides of the structure are depressed and elevated;

Fig. 15 is a view partly in section and partly in elevation taken in a plane at right angles to the plane in which Fig. 14 is taken;

Fig. 16 is a top plan view of one of the planing and upsetting tool elements or portions of the machine;

Fig. 17 is a view showing the rear end of said tool or element in elevation and also showing in transverse section the supporting carrier on which the said tool or element is caused to travel back and forth throughout the length of the machine;

Fig. 18 is a similar view of the opposite end of the said tool or element;

Fig. 19 is a view looking toward the right in Fig. 17 and showing a portion of the mechanism of the latter figure in elevation;

Fig. 20 is a transverse sectional view taken on the line 20—20 of Fig. 16;

Fig. 21 is a transverse sectional view taken on the line 21—21 of Fig. 16;

Fig. 22 is a view in side elevation of one of the first or initial rollers employed in the upsetting operation;

Fig. 23 is a similar view showing a roller with a cylindrical surface;

Fig. 24 is a similar view showing a roller having an annular groove formed in the periphery thereof; and Fig. 25 is a transverse sectional view of the edge portions of plates, or of the adjacent edge portions of a pipe formed by bending a plate, connected together by a lock bar.

Figure 5:
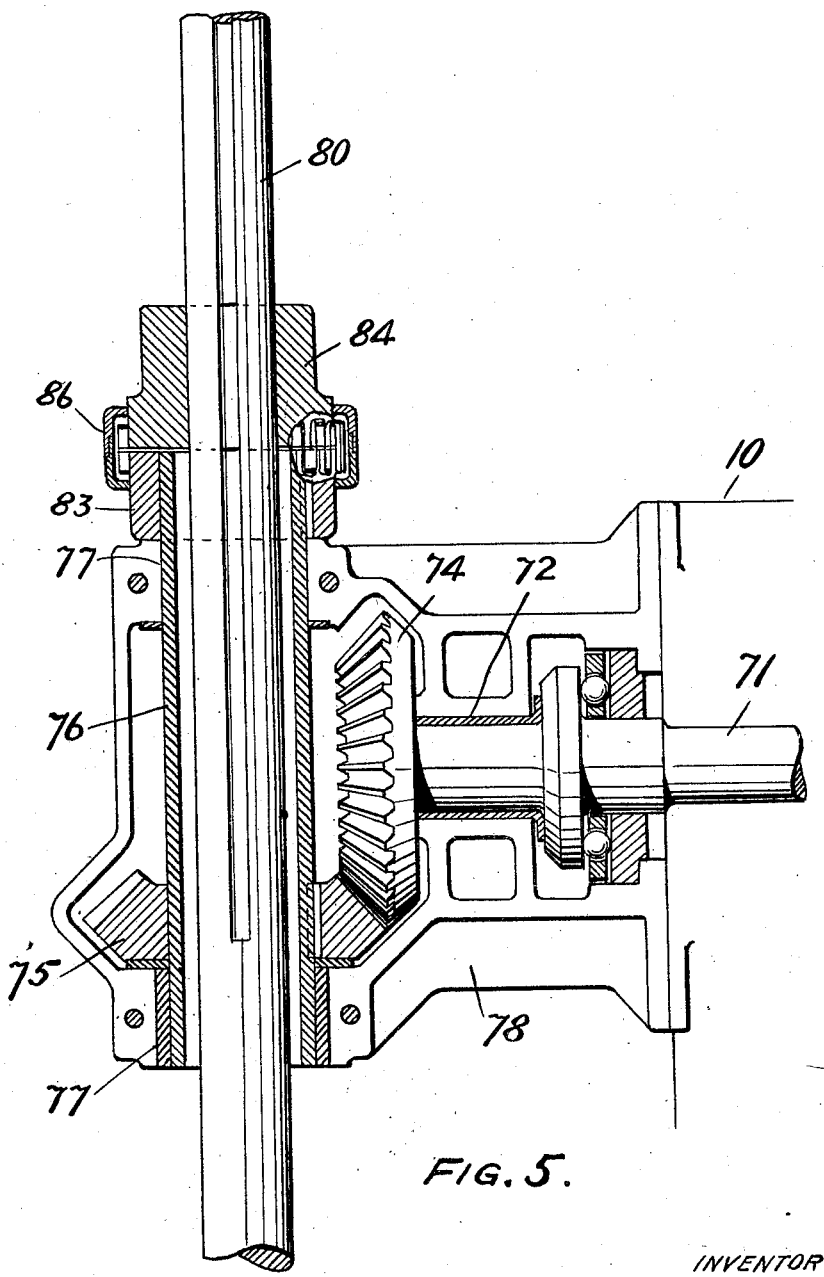
Fig. 5 is a sectional plan view taken in the plane 5—5 of Fig. 3 for the purpose of showing a detail of construction.

Upon reference to the drawings it will be noted that a number of shoe plates or cross sills 1 are mounted upon a suitable foundation 2 which should be of concrete or any other foundation affording the requisite solidity and strength. The number of the shoe plates or sills employed may be varied and in the construction as illustrated each of these plates comprises a member of T-shape in cross section, as shown in Fig. 8. The relatively narrow portion of each plate extends upwardly and is provided with a T-slot as shown at 3 within which the heads of bolts 4 are slidably mounted, the upper ends of which extend through the opposite ends of shoes 5 which are slidably mounted upon the opposite end portions of the said plates. By loosening the said bolts 4 the shoes 5 may be permitted to be adjusted toward and from the middle of the said shoe plates. The opposite ends of T-slots 3 previously referred to are closed by means of webs 6 each of which is provided with a screw threaded opening for receiving a screw threaded bolt 7. The inner ends of these bolts are adapted to contact with the outer ends of the outermost of a greater or less number of blocks 8 which are adapted to be located within the T-slot 3 previously referred to of each of the said plates. These blocks are located in the opposite ends of the T-slots 3 and the innermost of said blocks is adapted to contact with the outer ends of the shoe structures 5 previously referred to so as to resist the tendency of the said shoes to move outwardly when the said machine is operating to plane and upset the opposite edges of plates.

Mounted upon the said shoes and secured thereto are side beds or sills 10 the upper sides of which are provided with troughs 11 the inner surfaces of which are of angular formation, as is clearly shown in Fig. 6 of the drawings.

For the purpose of adjusting the said side beds or sills and the shoes to which they are secured toward and from each other I have provided cross sills 15 having rectangular troughs 16 in their upper sides within which are mounted slidable members 17 having depending portions 18 which project into the troughs 16 and the opposite sides of which are slightly tapered from the middle thereof in opposite directions. The portion 18 is provided with a central opening 19 in the bottom thereof which opening opens upon the opposite sides of the portion 18. The said portions 18 are also provided with slotted passageways in the bottoms thereof through which adjusting rods 20 extend or pass. These rods are provided with right and left handed screw threaded portions 20' and 20'', as is clearly shown in Fig. 6 of the drawings. These screw threaded portions are in screw threaded engagement or union with nuts or blocks 21 and 21' which are mounted or located within the openings 19. The opposite sides of these nuts or blocks are flat, as shown at 22. The flat sides of the nuts or blocks 21 fit closely against the inner surfaces of the opposite side walls of the troughs 16 so that these blocks are permitted to slide longitudinally of the said trough but have no other movement. It will be noted that upon the rotation of the adjusting rods 20 the members 17 are adjusted toward or from each other depending upon the direction of rotation of the said rods. It will also be understood that there are two of these adjusting rods, one for each of the sills 15. The members 17 previously referred to are provided with upper portions 25 of relatively large dimensions as compared with the portion 18. The portions 25 are secured to the under sides of the side beds or sills 10 previously referred to. It will be apparent, therefore, that upon adjustment of the members 17, comprising the portions 18 and 25, the said side sills are correspondingly adjusted. The opposite end portions of the adjusting rods 20 extend through and are mounted in bearings upon the base portions of supporting columns 26 at the opposite sides of the structure. It will be noted that there are two pairs or couples of these columns, the columns of each couple being located in opposed relation to each other at the opposite sides of the machine.

For the purpose of effecting rotation of the rods 20 I have provided upon one end of each of said rods a beveled gear 27 with which is in engagement or mesh a beveled gear 28. The beveled gears 28 are respectively mounted upon the outer ends of shafts 29 the inner ends of which are adapted to be connected and disconnected by means of clutch structures at 30 with and from the opposite outer ends of an intermediate shaft 31 in alinement with the shafts 29. The intermediate shaft 31 is adapted to be driven by a motor 32 shown in dotted lines in Fig. 2 of the drawings. It will be apparent that by adjusting the clutch structures 30 so that the inner ends of the shafts 29 are connected with the intermediate shaft 31 rotation of the latter will cause simultaneous rotation of both the shafts 29 and also simultaneous rotation of the adjusting rods 20 previously referred to. By simultaneously rotating the rods 20 simultaneous adjustment of the members 17 in the two sills 15 previously referred to is effected, in consequence of which the opposite side beds or sills 10 are simultaneously adjusted either toward or from each other, depending upon the direction of rotation of the adjusting rods 20.

If it be desired to adjust one or the other of the ends of the said side beds toward or from each other the proper clutch 30 should be operated to disconnect a shaft 29 from the intermediate shaft 31. Such disconnection having been effected only one of the shafts 29 will be rotated upon the rotation of the shaft 31. When this has been done it is obvious that adjustment of only one end portion of each of the side sills or beds will be effected. Such adjustment will cause the said beds or sills to assume an angular relation with respect to each other. In other words, the said sills will be caused to converge either from the rear toward the front or from the front toward the rear. In other words, the parts 17, 20, 29, the gears connecting the latter with the former and the parts 30 and 31 constitute means whereby the side beds or sills 10 may be caused to have simultaneous bodily movement toward or from each other, or the ends of said sills at one end or the other of the machine may be caused to move toward or from each other to cause convergence of the said sills from the front toward the rear or from the rear toward the front, as may be desired.

As already pointed out, the nuts or blocks 21 shown in Figs. 6 and 7 fit closely against the inner sides of the opposite walls of the trough 16. The sill 15 illustrated in Fig. 6 and the nuts or blocks 21 are located near the front of the machine and it is about these nuts that the side beds or sills 10 pivot upon the adjustment of either the front ends or the rear ends of the side beds or sills 10 in order to adapt the same to operate upon tapered plates. In other words, the sills swing about the axes of the blocks or nuts 21 shown in Fig. 6 near the front of the machine. It follows, therefore, that the corresponding nuts 21' mounted in the trough of the sill 15 near the opposite or rear end of the machine must be of a width or thickness slightly less than the distance between the inner sides of the opposite walls of the trough within which they are located in order that they may be permitted to move in the arcs of circles with the axes of the nuts 21 near the front end of the machine as centers.

The beveled gears 27 previously referred to also mesh and operate with beveled gears 35 mounted upon the lower ends of vertical shafts 36 supported in bearings 37 which project outwardly from the supporting columns 26 previously referred to. The upper ends of these shafts are provided with beveled gears 38 which mesh with beveled gears 39 mounted upon the ends of shafts 40 supported in bearings near the upper ends of the columns 26 previously referred to. These shafts 40 are provided with right and left hand screw threaded portions 41 which are in engagement with saddle blocks 42 slidably mounted upon the lower edges of the cross beams 43 connected with and supported upon the upper ends of the pairs of supporting columns 26. The blocks or saddles 42 are in screw threaded engagement with the right and left hand screw threaded portions 41 of the rotatable rods or shafts 40 so that upon rotation of the latter the said blocks or saddles are adjusted toward and from each other. These adjustments are in unison with the adjustments of the side beds or sills 10. Clamping beams 50 are suspended from these blocks or saddles 42. The said clamping beams extend lengthwise of the machine directly above the inner edge portions of the side beds or sills 10 previously referred to. These clamping beams co-operate with clamping edge portions 51 upon the inner side of the opposite side beds 10. Both the gripping edges 51 upon the said beds and of the clamping beams 50 are provided with facings 52 of very hard suitable metal for engaging the opposite sides of the edge portions of the plates, one of which is shown at 53, which are gripped between the said gripping beams 50 and the gripping edges 51 in the operation of the machine.

The gripping beams are supported by means of rods 55 the lower ends of which are connected to the upper edge portions of said beams while the upper ends thereof are connected to crossheads 56 which are secured to the upper ends of plungers 57 mounted in cylinders 58. These plungers are adapted to be hydraulically operated for the purpose of effecting upward movement of the pistons or plungers 57 to effect upward movement of the gripping beams 50. One cylinder 58 with the supporting and elevating means associated therewith is mounted upon each of the saddle blocks 42.

For the purpose of forcing the clamping beams downwardly for clamping and gripping the plates within the machine to be operated upon I have provided each of said beams with integral cylinders 59 adjacent their opposite ends within which plungers or pistons 60 are mounted. The upper ends of these pistons are provided with trunnions 61 which are mounted in semicylindrical seats 62 in the lower sides of the saddles 42 previously referred to. It will be seen that by this arrangement the plunger 60 may have swinging movement or motion with respect to the saddles 42. The purpose of this is to prevent binding and possible breaking of some portion of the apparatus in case it should happen that one end portion of either of the beams should descend more rapidly than the other, or in case one end should be stopped in some way or other with the other continuing to move. In such event, however, the rods 55 would give sufficiently to prevent injury.

When the beams 50 are adjusted angularly with respect to each other they swing slightly about the pistons 60 with respect to which the said beams also are vertically movable. When such swinging movement between the beams and the pistons 60 is effected there is slight twisting movement of the rods 55, sufficient to permit the necessary relative swinging movement between the said beams 50 and the pistons 60 to effect the angular adjustments of the said beams found necessary in the practical use of the apparatus.

The water under pressure for effecting downward clamping movements of the beams 50 is admitted to the cylinders 59 through openings 63 through the trunnions 62. These openings continue longitudinally through the plungers 60 and terminate at the lower ends thereof so that water may be introduced therethrough into the bottoms of the said cylinders.

The control of the water under pressure for operating the beams 50 and for operating the plungers 57 is effected by three-way valve structures of common and known construction and in consequence of which are not described herein. These valves operate so as to cause a flow of water under pressure into the cylinders 59 and to simultaneously permit the escape of water from the cylinders 58, or when it is desired to elevate the clamping beams water is supplied to the cylinders 58 underneath the plungers 57 and is simultaneously permitted to escape from the cylinders 59 through the plungers 60.

The flexible or jointed pipes for supplying the water for operating and controlling the clamping beams are shown at 65.

As already indicated, the saddle blocks 42 together with the clamping beams supported therefrom are adapted to be adjusted inwardly and outwardly simultaneously and synchronously with the corresponding movements of the side beds 10.

For the purpose of supporting the planing and upsetting mechanisms 70 upon the side beds or sills I have provided screw threaded shafts 71 which are mounted in bearings 72 and 73 at the opposite ends of the said beds or sills 10. In order to effect rotation of the shafts 71 to effect back and forth traveling movements of the planing and upsetting mechanisms 70 I have provided the front ends of said shafts with beveled gears 74 which are meshed or in engagement with beveled pinions 75 mounted upon hollow shafts 76 supported in bearings 77 at the opposite sides of brackets respectively composed of upper and lower parts 78 and 79. These brackets are supported upon the front ends of the side beds 10. For the purpose of driving the beveled pinions 75 I have provided a transverse shaft 80 supported in bearings 81 and 82 near its opposite ends. Associated with the hollow shafts 76 are flexible clutches or couplings (for instance Falk couplings) one member 83 of each of which is mounted upon the inner end of one of the said hollow shafts 76. The other member 84 of the respective clutches is slidably mounted upon the shaft 80 and is adapted to be secured or held in adjusted position by means of binding screws or other suitable means. The said members 84 have splined connection with the said shaft. It is necessary that the members 84 shall be adjustable upon the shaft 80 in order that they may be moved to correspond with the lateral adjustments or movements of the side beds or sills 10 upon the front ends of which the hollow shafts 76 are mounted.

The shaft 80 is driven from a reversible motor at 85, the driving connections being made by suitable mechanism in the manner as indicated but not described because such connections are in common use.

The vertical axes of the nuts 21 about which the side beds or sills 10 are adapted to be pivotally adjusted are located in substantial alinement with the planes of the abutting faces of the members 83 and 84 of the couplings previously referred to. In other words, the axes of the said nuts are located in vertical planes which extend between the opposing faces of the said coupling members 83 and 84. The reason for this is that in the pivotal adjustment of the said side beds it is necessary that the coupling members 83 be displaced to the smallest extent possible under the circumstances. Assume for the moment that the side beds or sills 10 converge from the front toward the rear of the machine as shown in Fig. 1 of the drawings,—it will be apparent that the angles between the said side sills and the shaft 80 will not be right angles and also that the said hollow shafts will be displaced so that the axes thereof are out of alinement with the axis of the shaft 80. In other words, the hollow shafts will occupy slightly angular positions with respect to the shaft 80. With the side members positioned with respect to each other as shown in Fig. 1 of the drawings it will be apparent that the sides of the hollow shafts nearest to or toward the ends of the said side beds will be nearer to the shaft 80 than the opposite sides thereof. The flexible couplings are of a character such that such angular displacements of the hollow shafts 76 may take place without disconnecting the coupling members 83 mounted thereon from the coupling members 84. The coupling between the members 83 and 84 is protected by a cover or shield 86.

The planing and upsetting mechanism comprises carriages or carriers 90 upon which the cutting knives 91 and the upsetting rollers 92 are mounted. The knives are mounted in adjustable holders 93 supported in the carriers 90. The holders are adapted to be adjusted by means of adjusting bolts 94 and each knife 91 is adapted to be held and clamped firmly within the holder 93 by means of binding screws or bolts 95 and wedges 95$^a$. The rollers of the respective carriers are mounted in supports 96 the inner or front edges of which are provided with bearings 97 for the wearing bushings 98 upon the trunnions 99 of the upsetting rollers 92. The rollers are secured and held in position in their bearings by means of fastening buttons 100 which are secured by means of fastening screws 101 to the front edge of the supports 96. The opposite ends of these buttons engage in slots formed in the bushings 98. In order to remove the rollers or any one of them the bolts 101 are loosened whereupon the buttons 100 may be turned so as to disengage the opposite ends thereof from the notches within the said bushings.

The support 96 is mounted within a socket or opening 102 within the carrier 90 and the rear edges of the opposite end portions of the said support bear against removable bearing blocks 103 which in turn are seated against the inner ends of adjustable bolts 104 mounted within screw threaded holes through projections formed upon the carrier 90. The blocks 103 may be removed so as to allow inward movement of the support for the upsetting rollers 92. Springs 105 wound about the outer end portions of the bolts 106 operate to yieldingly hold the support 96 against the bearing blocks 103. The bolts 106 extend through openings through portions of the carrier 90 and are secured at their inner ends to the supports 96, as is clearly shown in Fig. 16 of the drawings.

To facilitate the upsetting of the opposite edges of the plates so as to give them a conformation substantially as shown at 110 in Fig. 25 of the drawings, the first one or two of the rollers 92 are provided at the middle of their lengths with an annular projecting bead or rim portion 111 which in cross section is substantially of wedge shape. When these rollers are forced against the edges of the plates the wedge-shaped annular or circular portions 111 are forced into the middles of the edges thereof and cause the same to spread. These rollers are followed by rollers of cylindrical shape the surfaces of which are of cylindrical shape without any projections or depressions therein. In other words, the surfaces thereof throughout their lengths are parallel to the axes of the said rollers. The forcing of these flat faced rollers against the edges of the plates, after such edges have been grooved and spread as described, operates to smooth out the groove and to effect further spreading of the said edges. Finally rollers of the character of that shown in Fig. 24 are brought into action against the opposite edges of the plate being operated upon. These rollers are provided with annular grooves, as indicated at 112. The action of these grooves operates to impart to the edges a slightly convex shape, as indicated at 113 in Fig. 25 of the drawings.

As already stated, the carriers 90 have screw threaded engagement with the shafts 71 previously referred to and upon rotation of the latter are caused to travel in one direction or the other thereon depending upon the direction of rotation of said shafts. These carriers are provided at their front ends with means for engaging the plates and drawing them into the machine to be operated upon by the planing and upsetting mechanisms. Preferably such means is provided upon each of said carriers but it will be understood that for the handling of smaller plates; that is, plates which are relatively narrow, only one of the said carriers need be supplied with said means. The means for that purpose comprises gripping jaws 115 and 116 which are pivoted upon bolts 117. The said bolts 117 extend through slots 118 in the outer or rear ends of the gripping jaws 115 and 116. The inner gripping ends of the jaws 115 and 116 are adapted to be opened and closed by means of screw threaded bolts or rods 119 provided with shoulders or collars 120 which bear against the upper side of the jaw 115. The inner or lower end of each of the said bolts is screw threaded, as indicated at 121, and engages a screw threaded opening in a gripping jaw 116. It is apparent that by operating the bolt 119 the gripping jaws 115 and 116 may be opened and closed. The upper gripping jaws 115 have a tendency to move upwardly under the influence of coiled springs 123.

When the planing and upsetting mechanisms are at the forward end of the machine upon the shafts 71 a plate to be operated on is placed upon the feeding in rollers or supports 125 so as to bring one end thereof into position to be gripped by the inner ends of the gripping jaws 115 and 116. A portion of one of these plates is shown at 126 in Fig. 18 of the drawings. The opposite edges of the forward end of a plate having been placed between the gripping jaws the bolts 119 are operated to cause the said jaws to grip the said plate. Thereafter operation of the shafts 71 causes the cutting and upsetting tools to move toward the rear of the machine dragging the plate held by the gripping jaws into the machine with its opposite edges between the gripping portions of the side beds or sills 10 and the lower gripping edges of the gripping beams 50. In order to prevent the plates from dragging along with the under side of their opposite edge portions upon the upper sides of the gripping portions of the side beds 10 I have provided casters 130 mounted at intervals upon the opposite sides of the beds 10. One of these caster constructions is shown enlarged and in detail in Fig. 12 of the drawings. The rollers thereof are mounted upon the upper ends of supports 131 having stems 132 which are mounted in bearings 133 upon the inner sides of the side beds 10. These stems 132 are provided with collars 134 which are located between the bearings 133. Interposed between these collars and the lower bearing 133 are coiled springs 135 which operate to hold the caster supports in elevated position so that the said casters support the opposite edges of the plates above and out of contact with the gripping edges of the gripping portions of the side beds 10.

After the plates have been drawn by the gripping jaws 115 and 116 into positions within the machine the opposite ends thereof are fastened to a supporting beam 140 which extends longitudinally of the machine from end to end thereof. The upper edge portion of the said beam is provided with a channel 141 which opens through a relatively narrow slot 142 to the top surface thereof. Preferably the top surface of the said beam is slightly lower, say about three-sixteenths of an inch, than the top surface of the gripping portions of the side beds 10. The plates are provided with holes adjacent their opposite ends one of which holes at each end being located in the medial line of the said plates. The said plates having been carried into position as described clamping bolts 143 are passed through the said last mentioned holes or openings at the opposite ends of the plates and also through cross bars 143ª which extend transversely of the plates to a greater or less distance upon the opposite sides of the beams 140. The nuts 144 are then tightened so as to clamp against the cross beams 143ª and hold the same firmly and tightly against the opposite end portions of the plates and clamp them against the upper side of the beam 140. The heads of these bolts are located within the channel 141 and the inner sides thereof are clamped against the shoulders upon opposite sides of the slot 142. The fastening of the opposite ends of the plates to said beam in this manner operates to prevent the upward bowing of the same during the operation of planing and upsetting the opposite edges thereof.

As a means to prevent downward bowing of the portions of the plates upon opposite sides of the center beam or sill 140 I have provided casters 146 located at intervals throughout the length of the machine the top edges of which occupy positions in substantially the same plane as that of the top edge of the beam 140. It will be remembered that the plane of the top edge of the beam 140 is slightly below the plane of the top gripping surfaces formed upon the inner sides of the side beds 10, consequently whatever tendency to bowing there may be due to the very great pressures upon the opposite edges of the plates will be downward. It will be apparent that such downward bowing will be prevented or limited by the presence of the casters 146.

After the opposite edges of a plate have been planed and upset it is necessary that it be removed from the machine. To that end and for that purpose I have provided upon the rear ends of the carriers 90 of the planing and upsetting mechanisms (in opposite relation to the gripping jaws 115 and 116) pushing bars 150 which are mounted to slide in horizontal planes transversely of the said carriers 90. These bars are supported in guide ways 151 and are held in place by keepers 152. They are normally held in retracted position by means of coiled springs 153 the inner ends of which are connected to staples 154 upon the bars 150 while the outer ends thereof are connected to staples 155 upon the carriers 90. In Fig. 17 of the drawings the pusher bar 150 is illustrated in projected position. When the pusher bars are in such position they are adapted to contact with the front end of a plate, a portion of one of which is shown at 156 in Fig. 17 of the drawings, so that as the planing and upsetting mechanisms are traveling toward the rear of the machine dragging a plate into the machine they are simultaneously pushing a finished plate from the machine. For the purpose of projecting the inner ends of the pusher bars 150 into position to enable them to contact with the front end of a finished plate I have provided a lever 160 which is adapted to be retained in position to hold the pusher bars projected by means of pins 161 which are adapted to be inserted into openings in the ends of the carriers 90. As the finished plates are pushed from the machine by the pusher bars 150 they are supported upon rollers 162.

It will be understood that any suitable or preferred construction of feeding in and feeding out supporting means for the plates may be employed.

In the planing and upsetting operation it will be understood that the planing and upsetting mechanisms move or travel from the rear of the machine toward the front. It will also be understood that there is great tendency for the plates to move forward under the great pressures exerted by the planing and upsetting mechanisms. To insure against forward movement of a plate at such time I have provided stops at the opposite sides of the machine comprising bell crank levers 165 which are pivoted at their angles to the side beds 10 adjacent their front ends upon pivot bolts 166. The upper substantially horizontal arms of the said levers project rearwardly, or in the direction of the feeding in movement of the plates, and the rear ends thereof are held in planes slightly above the planes of said plates when in the machine by means of coiled springs 167 which are located between the forward sides of the lower ends of the downwardly extending arms of the said levers and abutments 168. The said springs are supported on adjustable screw bolts 170. As the plates enter the machine they travel over the upper sides of the horizontally extending arms of the levers 165 and hold the same in depressed position until the plate is in the machine, whereupon the springs 167 cause movement of the said levers into position with the rear ends of the horizontal portions of said levers in front of the forward ends of the said plates, as is shown in Fig. 12 of the drawings.

It will be understood that in the planing and upsetting of the opposite edges of the plates very great pressures are exerted upon the same and that the forces of reaction tending to cause lateral displacement of the gripping beams 50 relatively to the side beds 10 are very great. For the purpose of preventing such relative lateral displacement I have provided additional or supplemental means for connecting the said beams with the said beds. The means employed by me for that purpose comprises bolts 171 which extend through the opposite ends of the beams 50 and the lower ends of which engage in openings in the top sides of the side beds 10. For the purpose of raising and lowering the said bolts 171 I have provided the lever mechanism 172.

The upset edges of plates or of a plate bent to form a pipe are connected by a lock bar 173 of I-shape substantially as shown in Fig. 25 of the drawings. Joints formed in the manner as indicated in Fig. 25 of the drawings are of well known construction and need not be particularly referred to.

In the placing of the plates in the machine it is preferable that the narrow ends enter ahead of the wider ends and for that reason the side beds are shown as converging from the front toward the rear end of the machine in Fig. 1 of the drawings. However, it will be understood that the said side beds may be adjusted so as to cause them to converge from the rear toward the front, in which event the wider ends of the plates would be first introduced into the machine.

It will be seen that by my invention I have provided a machine of unitary structure comprising and embodying means by which the opposite or both edges of plates may be simultaneously planed and upset. It will also be seen that machines embodying my invention are adapted to be employed for simultaneously planing and upsetting the opposite edges of rectangular plates or of plates which taper from end to end.

Having thus described my invention, what I claim and desire to secure by Letters Patent is:

1. The combination with a machine for trimming and upsetting the longitudinal edges of metal plates, said machine having longitudinally movable cutting and upsetting mechanisms thereon, of a run-out support at one end of the machine, a feeding-in support at the other end of the machine, one of said mechanisms having sheet gripping and sheet pushing devices thereon, whereby a plate may be drawn into the machine from the feeding-in support while a finished plate is being forced out onto the run-out support.

2. A machine for trimming and upsetting the edges of metal plates including a pair of longitudinally extending lower clamping beds, longitudinally extending upper clamping beams over each of the lower beds, means for adjusting said beds toward and from each other and also for adjusting them into angular relation with respect to each other and for correspondingly adjusting said beams, carriages movable along the lower clamping beds, said carriages having means thereon for operating on the projecting edges of plates engaged between the beds and the beams.

3. A machine for trimming and upsetting the edges of metal plates comprising a pair of spaced apart bed members having clamping surfaces thereon, a pair of clamping beams vertically movable over the clamping surfaces of the bed members, means for simultaneously adjusting either end of the bed members toward or away from each other, means for correspondingly and simultaneously adjusting the upper beams upon adjustment of the said bed members, a carriage movable along each bed member outside of the clamping surface thereof, means for operating the carriages in unison, and means on the carriages for operating on the projecting edges of plates confined between the clamping beams and the bed members.

4. A machine for trimming and upsetting the edges of metal plates comprising a pair of spaced apart units having upper and lower clamping elements, a sheet trimming and upsetting carriage movable along each unit, means for operating the carriage of the two units in unison, and means for adjusting said units toward and from each other and into positions in which they converge from one end toward the other.

5. A machine for trimming and upsetting the edges of metal plates comprising a pair of spaced apart units having upper and lower clamping elements, a sheet trimming and upsetting carriage movable along each unit, means for operating the carriages of the two units in unison, and means common to the units for adjusting the same bodily toward or from each other and for adjusting either ends of the said units toward and from each other in synchronism.

6. A machine for trimming and upsetting the edges of metal plates comprising a pair of spaced apart units having upper and lower clamping elements, a sheet trimming and upsetting carriage movable along each unit, means for operating the carriages of the two units in unison, means for adjusting either ends of the units toward and from each other in synchronism, sheet pushing means on one of the carriages for ejecting a plate from the machine, and sheet gripping means on one of the carriages for drawing a sheet to be treated into the machine.

7. In a machine for trimming and upsetting the edges of metal plates, a pair of spaced apart bed members having clamping surfaces thereon and having guides extending therealong outside of the clamping surfaces, an upper clamping member over each of the clamping surfaces of the bed members for co-operation therewith, a carriage movable along the guideway of each bed member, means for driving the carriages along the guideways in unison, a plate gripping device on the forward end of one of the carriages, a retractable plate pushing device on the rear end of one of the carriages, and cutters and upsetting rollers on each carriage, said cutters and rollers being disposed to engage the projecting edges of a plate resting on the clamping surfaces of the two bed members.

8. In a machine for trimming and upsetting the edges of metal plates, a pair of spaced apart bed members having clamping surfaces thereon and having guides extending therealong outside of the clamping surfaces, an upper clamping member over each of the clamping surfaces of the bed members for cooperation therewith, a carriage movable along the guideway of each bed member, means for driving the carriages along the guideways in unison, a plate gripping device on the forward end of one of the carriages, a retractable plate pushing device on the rear end of one of the carriages, cutters and upsetting rollers being disposed to engage the projecting edges of a plate resting on the clamping surfaces of the two bed members, and plate supporting means between the two bed members.

9. In a machine for trimming and upsetting the edges of metal plates, a pair of spaced apart bed members having clamping surfaces thereon and having guideways extending therealong outside of the clamping surfaces, an upper clamping member over each of the clamping surfaces of the bed members for co-operation therewith, a carriage movable along the guideway of each bed member, means for driving the carriages along the guideways in unison, a plate gripping device on the forward end of one of the carriages, a retractable plate pushing device on the rear end of one of the carriages, planing cutters and upsetting rollers on each carriage, said cutters and rollers being disposed to engage the projecting edge of a plate resting on the clamping surfaces of the two bed members, a plate guiding support between the two bed members, and means for adjusting the bed members and upper clamping members to different positions with respect to each other.

10. In a machine for trimming and upsetting the edges of metal plates, a pair of spaced apart bed members each having a clamping surface thereon extending therealong, a guideway on each bed member extending therealong outside the clamping surfaces, a carriage in the guideway of each bed member, a screw shaft along each guideway operatively engaging the respective carriages to effect movement thereof along the guideways, a drive shaft with which each of the screw shafts has a splined driving connection, a reversible driving unit for the shaft, upper clamping members over the clamping surfaces of the bed members, means common to the bed and clamping members for causing simultaneous adjustment thereof in unison transversely of the machine, and means for raising and lowering the upper clamping members, said carriages having means thereon for operating on the projecting edges of plates or sheets resting on the said bed members, and confined between the clamping surfaces thereof and the upper clamping members.

11. In a machine for trimming and upsetting the edges of metal plates or sheets, a pair of spaced apart bed members each having clamping surfaces thereon extending therealong and each having a guideway extending therealong outside of the clamping surface, a carriage having edge cutting and upsetting means thereon in each guideway and movable therealong, means for driving the respective carriages in synchronism, an arched beam spanning the two bed members at each end thereof, a couple of pairs of lifting and lowering jacks slidably carried on each beam, clamping beams over the clamping surfaces of the bed members suspended at each end from one of the lifting jacks on the arches, a separate screw mechanism at each end of the bed members for moving said bed members toward and from each other, a screw mechanism on each beam for moving the respective jacks toward and from each other, and means connecting the screw mechanism on the beams with the corresponding screw mechanism for moving the bed members, whereby the jacks and bed members at either end of the machine may be correspondingly moved to maintain the clamping beams directly over the clamping surfaces of the bed members.

12. In a machine for trimming and upsetting the edges of metal plates or sheets, a pair of spaced apart bed members each having a clamping surface thereon extending therealong and each having a guideway extending therealong outside of the clamping surface, a carriage mounted in each guideway and movable therealong, said carriage having edge cutting and upsetting means thereon, means for driving the respective carriages in synchronism, an arched beam spanning the two bed members at each end thereof, a couple of pairs of lifting and lowering jacks slidably carried on each arched beam, clamping beams over the clamping surfaces of the bed members suspended at each end from one of the jacks on the arched beams, a separate screw mechanism at each end of the bed members for moving said bed members toward and from each other, a screw mechanism on each arched beam for moving the respective couples of jacks toward and from each other, and means connecting the screw mechanism on the arched beams with the corresponding screw mechanism for moving the bed members, whereby the jacks and bed members at either end of the machine may be correspondingly moved to maintain the clamping beams directly over the clamping surfaces of the bed members, and common means for operating the screw mechanisms at each end of the machine separately or together and in reverse direction.

13. The combination with a machine for trimming and upsetting the edges of a metal plate, which machine has a longitudinally movable plate gripping and plate pushing device thereon, of a feeding-in support at one end of the machine and a run-out support at the other end thereof, whereby a plate to be operated upon may be entered endwise of the machine while a finished plate may be simultaneously ejected therefrom.

14. The combination with a machine for trimming and upsetting the edges of a metal plate, which machine has spaced apart longitudinally extending clamping units, a reciprocable carriage movable along each unit having cutters thereon and upsetting rollers thereon, means for moving the carriages, plate gripping means at the forward ends of the carriages and plate pushing means at the other ends thereof, of a feeding-in support at one end of the machine and plate receiving means at the other end of the machine, whereby plates may be operated upon on the movement of the carriages in one direction and the finished plates ejected while another one is being moved in by the movement of the carriages in the opposite direction.

15. The combination with a machine for trimming and upsetting the edges of a metal plate, which machine has spaced apart longitudinally extending clamping units, a reciprocable carriage movable along each unit having cutters thereon and upsetting rollers thereon, means for moving the carriages, plate gripping means at the forward ends of the carriages, and plate pushing means at the rear ends of the carriages, of a feeding-in support at one end of the machine and plate receiving means at the other end of the machine, whereby plates may be operated upon on the movement of the carriages in one direction and the finished plate ejected while another one is being moved in by the movement of the carriages in the opposite direction, and plate supporting means intermediate the said clamping units.

16. A machine for planing and upsetting the edges of metal plates, including a pair of plate clamping units for engaging opposite edge portions of a plate, means common to the said units for rectilinearly and angularly adjusting the said units with respect to each other, an edge planing and upsetting mechanism associated with each unit, and driving means for the edge planing and upsetting mechanisms.

17. In a machine for planing and upsetting the edges of metal plates, a pair of longitudinally extending bed members having clamping surfaces thereon, a clamping girder supported over each bed member and movable vertically with respect thereto, means movable along the outer edge of each bed member for operating on the edges of metal plates supported on the bed members, and a plurality of resiliently supported rollers between the bed members, said rollers normally projecting above the clamping surfaces of the bed members to yieldingly support a plate while being moved into or out of the machine out of contact with said clamping surfaces and said rollers adapted to be depressed by a plate resting thereon when the clamping girders are lowered to clamp the plate.

18. A machine for planing and upsetting the opposite edges of metal plates comprising a planing and upsetting mechanism on each side of said machine, separate means for supporting said mechanisms, means for causing synchronous movements of said mechanisms to simultaneously plane and upset both edges of a plate located between the said mechanisms, and means common to the said separate supporting means for simultaneously adjusting the same rectilinearly and for adjusting the same angularly toward or from each other.

19. In a machine for planing and upsetting the opposite edges of metal plates, the combination of planing and upsetting mechanisms, one of said mechanisms being located at each side of the machine, means for adjusting the said mechanisms rectilinearly and angularly toward or from each other, and means for effecting synchronous movements of said mechanisms longitudinally of the said machine in operative engagement with the opposite edges of a plate to plane and upset the same.

20. In a machine for planing and upsetting the opposite edges of metal plates, the combination of bed members, means for supporting said bed members, revoluble shafts mounted on said bed members, a planing and upsetting mechanism mounted on said shafts and adapted to travel back and forth thereon, a driving shaft arranged transversely of the said machine adjacent one end thereof, hollow shafts mounted upon the said bed members through which the said driving shaft extends, flexible coupling connections between said driving shaft and said hollow shafts, connections between the said driving shaft and the said revoluble shafts mounted upon the said bed members, pivots connected to the said bed members intermediate their ends and relatively near the said flexible couplings and in alinement with the engaging faces thereof, and means for effecting adjustment of the said bed members about said pivots.

21. In a machine for simultaneously planing and upsetting the opposite edges of a metal plate, the combination of side bed members, means for adjustably supporting said bed members, revoluble screw threaded shafts mounted upon said bed members, planing and upsetting mechanisms mounted on said revoluble screw threaded shafts, a driving shaft extending transversely of the said shafts in adjacent relation to the ends thereof at one end of the machine, hollow shafts mounted on the ends of said side bed members adjacent the said driving shaft, the latter shaft extending through the said hollow shafts, flexible couplings between the said hollow shafts and the said driving shaft, gear connections between the said hollow shaft and the adjacent end of said revoluble screw threaded shafts whereby upon rotation of the said driving shaft the said hollow shafts are driven to drive the said screw threaded shafts to effect movement of the said planing and upsetting mechanisms of the latter, pivots having connection with the said side bed members intermediate their ends and relatively near the said flexible couplings and in alinement therewith, and means for effecting adjustment of said side bed members upon the said pivots.

22. In a machine for simultaneously planing and upsetting the opposite edges of a metal plate, the combination of side bed members each of which is provided upon the inner edge portion of its upper side with a plate gripping surface, means for adjustably supporting the said side bed members, gripping means supported above and in the plane of the gripping portions of said side bed members, means for raising and lowering the said gripping means for gripping and releasing the opposite edge portions of a plate, means for simultaneously adjusting the said side bed members and said gripping beams toward and from each other and into angular positions with respect to each other, planing and upsetting mechanisms mounted upon the said side bed members, means for causing traveling movement of said mechanisms to effect planing and upsetting of the opposite edges of said plate, and means for preventing longitudinal movement of the said plate from between the gripping surfaces of the said side bed members and the said gripping means under the influence of the said mechanisms when the latter are in operation.

23. In a machine for simultaneously planing and upsetting the opposite edges of a metal plate, the combination of side beds, means for clamping and holding a plate upon said beds, upsetting mechanisms mounted to travel back and forth upon said beds, and means for effecting simultaneous pivotal movement of said beds about pivots near their front ends.

24. In a machine for simultaneously planing and upsetting the opposite edges of a metal plate, the combination of side beds, means for clamping and holding a plate upon said beds, upsetting mechanisms mounted on said beds, means for effecting simultaneous back and forth traveling movement of said mechanisms upon said beds, pivots for said beds which pivots are located respectively near one end of each bed, and means for effecting simultaneous pivotal movement of said beds about said pivots.

25. In a machine for simultaneously planing and upsetting the opposite edges of a metal plate, the combination of side beds, clamping beams, planing and upsetting mechanisms mounted to travel back and forth upon said beds, and means common to said beds and said beams for effecting simultaneous and corresponding pivotal movements of the said beds and the said beams about pivots near their front ends.

26. A machine for trimming and upsetting the edges of metal plates comprising a pair of spaced apart units having upper and lower clamping elements, means having connection with the lower of said elements for adjusting the same toward and from each other, means having connection with the upper of said elements for adjusting the same toward and from each other, means common to the two last mentioned means for actuating the same, and means for effecting relative movements of the elements of each unit into and out of clamping relation with respect to each other.

27. A machine for trimming and upsetting the edges of metal plates comprising a pair of spaced apart units having upper and lower clamping elements, means having connection with the upper of said clamping elements for effecting adjustments thereof toward and from each other, means having connection with the lower of said clamping elements for effecting adjustments thereof toward and from each other, means for simultaneously actuating the last two mentioned means for effecting synchronous movements of adjustment thereof, and means for effecting relative movements of the elements of each unit into and out of clamping relation with respect to each other.

28. A machine for trimming and upsetting the edges of metal plates comprising a pair of spaced apart units having upper and lower clamping elements, adjusting means having direct connection with the upper of said clamping elements, adjusting means having direct connection with the lower of said clamping elements, means common to the two adjustable means for effecting actuation of the said adjusting means in one direction or the other to effect adjustment of the respective elements of the upper clamping elements and of the lower clamping elements toward and from each other, and means for effecting relative movements of the clamping elements of each unit into and out of clamping relation with respect to each other.

29. In a machine for simultaneously upsetting the opposite edges of a metal plate, the combination of side beds, a rotatable screw mounted upon each bed, the said screws being of substantially the same length as the beds, upsetting mechanism mounted upon each bed and engaged by the screw mounted upon said bed, pivots for said beds, which pivots respectively are located near one end of each bed, means having operative connection with the said screws at the ends nearest the pivots for effecting rotation of said screws, and means for effecting pivotal movement of said beds about said pivots.

30. In a machine for simultaneously upsetting the opposite edges of a metal plate, the combination of side beds, a rotatable screw mounted upon each bed, the said screws being of substantially the same length as the beds, upsetting mechanism mounted upon each bed and engaged by the screw mounted upon said bed, pivots for said beds, which pivots respectively are located near one end of each bed, means for effecting pivotal movement of the said beds and the said screws about said pivots, a shaft extending transversely of the said machine adjacent the ends of said screws nearest the said pivots, and driving mechanisms between the said shaft and the said screws, the said driving mechanisms including means whereby a variation of the angular relationship between the said screws and the said shaft may be permitted.

31. In a machine for simultaneously upsetting the opposite edges of a metal plate, the combination of side beds, a rotatable screw mounted upon each bed, the said screws being of lengths substantially co-equal with the said beds, upsetting mechanism mounted upon each bed and engaged by the screw mounted upon said bed, pivots for the said beds, which pivots respectively are located near one end of each bed, means for effecting pivotal movement of the said beds about said pivots, a rotatable shaft extending transversely of the said machine in adjacent relation to the ends of said screws nearest the said pivots, clutch members secured upon the said shaft to rotate therewith, tubular members mounted upon the ends of said beds adjacent the ends of said screws, the internal diameters of said tubular members being greater than the external diameter of the said shaft, clutch members mounted upon the inner ends of said tubular members and adapted to cooperate with the clutch members mounted upon the said shaft, and gear mechanisms between the said tubular members and the said screws for driving the latter.

In testimony that I claim the foregoing as my invention, I have hereunto signed my name this 9th day of May, A. D., 1925.

EDWARD T. PETERSON.